Oct. 19, 1948.  A. F. JOHNSON  2,451,490
PRODUCTION OF ALUMINUM
Filed Aug. 4, 1944  2 Sheets-Sheet 1
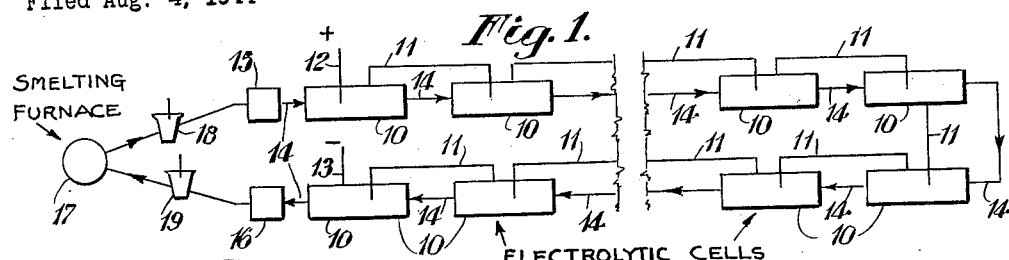
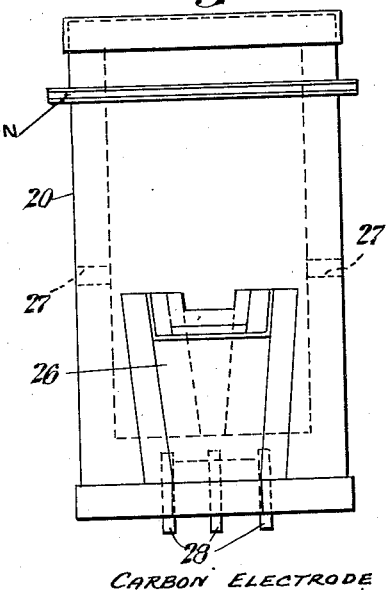
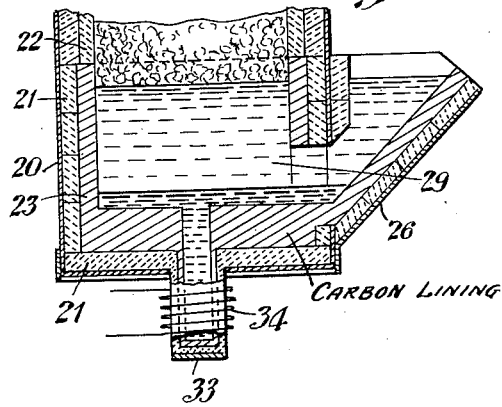
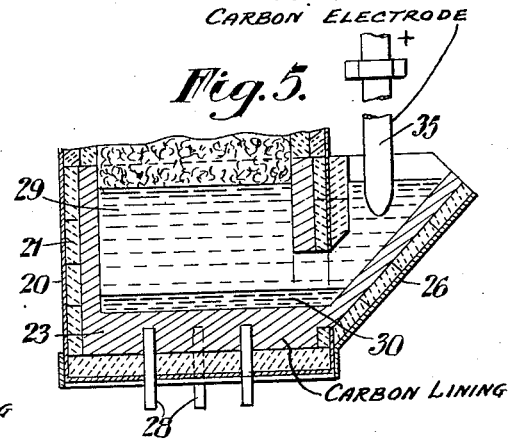
INVENTOR
ARTHUR F. JOHNSON
BY
Pennie, Davis, Marvin and Edmonds
ATTORNEYS

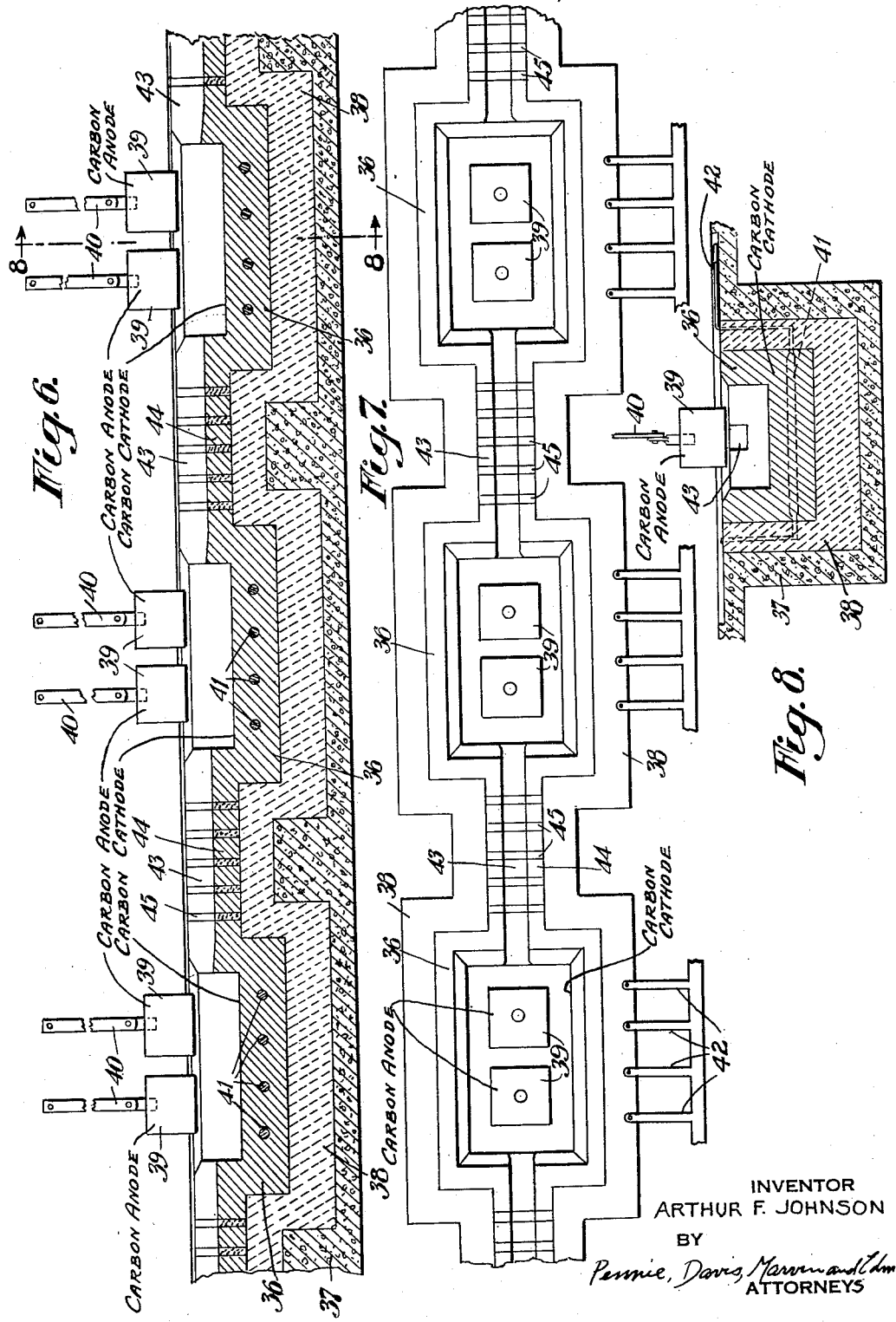

Patented Oct. 19, 1948

2,451,490

UNITED STATES PATENT OFFICE 2,451,490

PRODUCTION OF ALUMINUM

Arthur F. Johnson, Cambridge, Mass., assignor to
Reynolds Metals Company, Inc., Richmond, Va.,
a corporation of Delaware Application August 4, 1944, Serial No. 548,043

2 Claims. (Cl. 204—67)

My invention relates to improvements in the production of aluminum, the metal, from ores containing hydrated aluminum oxides, commonly designated "bauxites." Such ores usually contain substantial proportions of combined iron, silicon and titanium, but the presence of substantial amounts of these elements in aluminum produced from such ores seriously impairs the quality of the metal.

For many years the aluminum of the world has been produced by electrolytic reduction by the Hall process of alumina prepared from bauxite, generally by the Bayer process. The Bayer process and the Hall process are both well detailed in the technical literature; see The Aluminum Industry, by Edwards, Frary & Jeffreys, Aluminum and Its Production, (McGraw-Hill, 1930), pages 124–131 for the Bayer process and pages 300–318 for the Hall process. My invention is an improvement of this long-established conventional practice. My invention comprises a modification of the Hall process and a substitution for the Bayer process, and in one aspect provides a new combination of steps for the production of aluminum from bauxite.

My invention provides improved economy, simplified operation, improved operation and improved control of the process, and further provides for recovery of useful by-products. These several advantages will appear in more detail as the description proceeds.

In the Hall process, alumina is subjected to electrolysis in solution in fused cryolite at a temperature approximating, or perhaps somewhat less than, 1000° C. between carbon electrodes with a voltage drop across each cell of the order of 5.5–6 volts. Sometimes other salts, fluorides, and fluorspar in particular, are added to the cryolite to lower the melting point of the fusion. Such additions, however, also tend to lower the solubility of alumina in the fusion. In domestic practice, the fusion usually includes other fluorides, and the range of concentration of dissolved alumina approximates 1%–6% of the fusion. In foreign practice, cryolite is sometimes used without added fluorides and the upper limit of the range of alumina concentration in the fusion is higher. Direct current in high amperages being economically available at voltages of about 600–700, it is common practice to operate say 120 such cells in series electrically. However, as far as all other features of operation are concerned, particularly the charging of alumina and control of the composition of the fusion, each of the cells of such an electrical series has hitherto been operated as a single unit, individually charged and individually controlled. Thus, for practical purposes, a single electrical operation has been 120 chemical operations in the Hall process, as conventionally practiced.

In a typical single conventional cell: The bottom electrode, the cathode, may be 75 inches wide and 148 inches long and the top electrode, the anode, may be 45 inches wide and 120 inches long, the liquid electrolyte may aggregate 8000 lbs. and the solid electrolyte, in the form of a crust covering the liquid electrolyte may aggregate 7000 lbs. (excluding electrolyte carried into the cell lining by electroosmosis). The fused metal, tapped every three days for example, may vary in depth over the bottom electrode from a minimum of about 2 inches to a maximum of about 6 inches, the depth of liquid electrolyte over the fused metal being about 9 inches, and the power may approximate 32,000 amperes at about 5.5 volts, the current efficiency being about 85%. As the alumina dissolved in the fusion is consumed by the electrolysis, fresh alumina is added from time to time. In normal operation, fresh alumina is distributed over the frozen crust on the electrolyte from time to time, where it is preheated, and as required is manually stirred or poked through the crust into the liquid electrolyte. In the event of irregular operation due to a deficiency of alumina in the electrolyte, cold alumina may be stirred into the electrolyte to overcome the so-called "anode effect" without any period of preheating on the crust covering the electrolyte in the cell. A single laborer can usually tend eight cells for his shift and the operation of each of the cells is a separate operation, in effect a batch operation since alumina is charged and consumed and charged again when consumed and so on, although the electrolysis is carried out continuously.

Satisfactory operation requires control in a number of respects. If the temperature much exceeds 1000° C., cryolite is lost by vaporization yet a temperature above the melting point of the electrolyte must be maintained in the region of electrolysis. In regular operation, temperature control is effected by adjusting the distance between the electrodes in each cell appropriately with respect to the composition of the electrolyte in the cell. If the concentration of dissolved alumina in the fusion becomes too low, less than about 1%, the fluorides apparently are electrolyzed, an envelope of gas forms on and insulates the upper electrode, and overheating of the cell occurs. This is the so-called "anode effect." This condition is remedied by adding alumina to the fusion which, dissolving, lowers the resistance of the fusion and restores normal operating conditions thus reducing excessive temperatures. If the concentration of solid alumina in the fusion becomes high enough to permit undissolved alumina to reach the layer of fused metal covering the bottom electrode, such solid alumina tends to sink into the fused metal, forming an insulating layer on the cathode and rapidly increasing the electrical resistance of the cell, and as a consequence the heat liberation within and the power consumption of the cell. There is no certain remedy for this condition other than to cut the cell out of operation until it has cooled off and put it back in operation in the regular way after any necessary repairs. Time is required for solution of alumina in the cryolite fusion and consequently the condition just described may occur even though the alumina concentration is well within the solubility limit of the fusion if, for example, the alumina is added to the fusion when too cold or in a form too dense or in particles too large to dissolve rapidly. Thus, for example, while a cell would operate satisfactorily with a fusion containing 10% by weight of dissolved alumina, it would not operate satisfactorily with a fusion containing 6% of dissolved and 4% of undissolved alumina.

The Hall process, as conventionally practiced, requires a regular supply of fresh alumina of high purity. The impurities commonly associated with aluminum in the raw ore, iron, silicon, and titanium, being more electro-positive than aluminum, contaminate the metal liberated by electrolysis as alloying elements to the extent that they are present in the alumina charged to the process. Even small percentages of such impurities radically impair the quality of the metal produced. Thus, the production of large quantities of alumina of high purity is an important part of the commercial production of aluminum, about two pounds of alumina being required for each pound of aluminum.

In the Bayer process, alumina is extracted from bauxite by digestion, at elevated temperature and under superatmospheric pressure, with aqueous caustic soda to form a solution of sodium aluminate supersaturated with respect to aluminum tri-hydrate, impurities insoluble in or slowly soluble in this solution, including compounds of iron, silicon, and titanium, are separated from this solution as a mud, by settling, filtration or a combination of the two, aluminum tri-hydrate is then precipitated from this solution by seeding, and the aluminum tri-hydrate separated from the seeded solution, after setting aside the seed crystals required to continue the process, is calcined to produce alumina of high purity. The recovered solution, after regeneration with added caustic soda or lime and soda ash, is re-used cyclically in the digestion. In some plants the sodium aluminate solution, instead of being formed by digestion as in the Bayer process, is formed by sintering the ore with lime or lime and soda and by extracting the aluminate from the sintered product with water or aqueous caustic soda, the Deville-Pechiney process. The sodium aluminate solution is then processed as in the Bayer process to recover alumina. In either case, the production of alumina of the requisite purity requires a large amount of time, labor and equipment and involves a number of steps each requiring careful control.

In carrying out my invention, I put several cells of a series in chemical series as well as in electric series; that is, I circulate the fused electrolyte seriatim through the several cells of a series in which it is subjected to electrolysis, and I maintain the required concentration of alumina in the circulating electrolyte by dissolving alumina in the fusion supplied to the first cell of the series before it enters that cell, the fusion in which the alumina is dissolved being the fusion discharged from the last cell of the series in repetitions of the cycle once regular operation has been established. My invention also includes, in this combination of steps, a particular method of adding alumina to the circulating electrolyte and a correlation of this step with segregation of the less pure metal separated, in the first cell or first few cells of the series whereby further important advantages are secured. A metal of high purity is separately collected from cells beyond such first cell or first few cells in the direction of electrolyte circulation.

According to my invention, I arrange the several cells of a series, say 60 cells, on a slight gradient, just enough to maintain flow of the fused electrolyte, I connect the upper portion of that part of the cell chamber normally occupied by liquid electrolyte of each cell to the next in the series by a trough, thermally well insulated and with appropriate insulation to separate the successive cell chambers electrically, I provide a pair of thermally well insulated reservoirs similarly connected to the cell chambers of the first and the last cells of the series, and I provide a smelting furnace to which the bauxite or other aluminiferous material is charged, to which I transfer fusion from the reservoir connected to the last cell of the series and from which I transfer the regenerated fusion to the reservoir connected to the first cell of the series. The reservoirs are advantageous but they may be omitted and the fusion transferred to and from the first and last cells, respectively, of the series. Two such series of 60 cells again connected in electrical series will take the place of the conventional battery of 120 cells. The conductivity of the electrolyte being relatively low, I make the current losses through the stream of electrolyte connecting successive pairs of cells negligible by making these troughs long with respect to the distance between the electrodes in each cell and by restricting their cross section. Transfer of electrolyte by ladle to and from the smelting furnace breaks the electrical circuit through this part of the cycle of movement of the electrolyte. For example, to connect cells of the conventional construction previously described, passage through the several troughs may be made about 30 inches to 40 inches long and about 6 inches wide and deep enough to provide for a stream of liquid electrolyte about 4 inches deep covered with a crust of frozen electrolyte of about the same depth. The cycle of movement of the electrolyte is also a cycle of variation of alumina content from a maximum entering the first cell to a minimum leaving the last. Since I dissolve the alumina in the fusion before the fusion is supplied to the first cell of the series, I no longer need be concerned with the rate of solution of the alumina in the fusion in the cell and, as a consequence, I can safely charge a fusion containing a high concentration of alumina to the first cell since the alumina is dissolved before the fusion enters the cell. Then, having thus been able to raise the initial concentration, I can economically carry a higher than normal minimum concentration of alumina in the fusion leaving the last cell of the series to avoid occurrence of the "anode effect." For example, the concentration of alumina in the fusion as it moves through the series of cells may vary from about 12%–14% to about 2%–2.5% in each cycle. Having selected a minimum concentration, circulation of the electrolyte is maintained at a rate sufficient to maintain this minimum concentration.

Since a single 32,000 ampere cell will produce about 450 pounds of aluminum per day, it will be obvious that a large number of cells is required for substantial commercial production of aluminum quite apart from considerations of the economics of direct current power supply previously mentioned. To put into effect regular chemical control by regular chemical analysis of the electrolyte in each cell of several batteries of 60 cells would be an enormous task. The same degree of chemical control can be established in the practice of my invention by two analyses for every 60 analyses required in conventional practice. This illustrates one of the advantages in control attained by my invention. Also, variations in composition of the electrolyte in any one cell are very small in the practice of my invention as compared to the variations incident to the periodic charging of individual cells characteristic of conventional practice.

I have illustrated diagrammatically and conventionally, in the accompanying drawings, apparatus appropriate for carrying out my invention and I have, in Fig. 1, diagrammed the process of my invention. It will be understood that the individual cells used may be of any conventional construction provided they are arranged, each with respect to the others in the series, and with respect to the equipment for adding alumina to the fusion, as described.

In the accompanying drawings:

Fig. 1 is a flow diagram illustrating the practice of the process of my invention;

Fig. 2 is a vertical section of a smelting furnace;

Fig. 3 is an elevation normal to the view shown in Fig. 2;

Fig. 4 is a fragmentary section of a modified arrangement of the lower part of the smelting furnace illustrated in Fig. 2;

Fig. 5 is a fragmentary section of another modified arrangement of the lower part of the smelting furnace illustrated in Fig. 2;

Fig. 6 is an elevation in section of three of a series of cells arranged for practicing my invention;

Fig. 7 is a plan of the cells illustrated in Fig. 6; and

Fig. 8 is a section on line 8—8 in Fig. 6.

Referring first to Fig. 1: The several rectangles 10 represent eight cells of a series of say 60. The cells are in electrical series through the several connections 11, the terminal anode being indicated at 12 and the terminal cathode at 13. The several cells are also connected in chemical series by troughs 14. A reservoir 15 is similarly connected to the first cell of the series and another reservoir 16 is similarly connected to the last cell of the series. The circle 17 represents a smelting furnace. Transfers between the smelting furnace 17 and the reservoirs 15 and 16 are made as indicated by means of ladles 18 and 19, respectively. The reservoirs 15 and 16 are advantageous, but they may be omitted and transfers of fused electrolyte from and to the smelting furnace made directly to and from the first and last cells of the series, respectively. In carrying out the process of my invention, as illustrated in Fig. 1, the aluminiferous material is charged to the smelting furnace 17, its alumina content is there dissolved in depleted electrolyte from the last cell of the series and the thus regenerated electrolyte is supplied to the first cell of the series, the electrolyte is circulated through the several cells of the series, and a portion of its alumina content is electrolytically reduced to aluminum in each cell. Ores containing hydrated aluminum oxides commonly designated as "bauxites" or similar ores may be charged directly to the smelting furnace, or the bauxite may first be calcined or, for example, a high silica ore may first be processed to reduce its silica content as by being treated with fluorides to volatilize silica or smelted with iron to eliminate silica as ferro-silicon; for this reason I refer to aluminiferous material as the charge to the smelting furnace. A special purification operation may be carried out in the smelting furnace as described below. However, in any event, elements more electro-positive than aluminum are liberated in the first cell or first few cells, for example, the first two or three, of the series. Thus, by segregation of the metal produced in the first few cells through which the electrolyte flows, metal of high purity can be produced directly in the remaining cells of the series without requiring rigorous exclusion of impurities such as iron, silicon, or titanium from the fresh or make-up material added to the electrolyte. In this aspect particularly, the operation of the smelting furnace 17 becomes, in the practice of my combined operation, much less involved than the processing necessary to produce alumina of the purity required by the Hall process as conventionally practiced.

Referring to Figs. 2, 3, 4 and 5: The smelting furnace illustrated comprises a steel shell 20 electrically separated into two parts by insulation between the annular flanges near the upper end of the shell, an insulating refractory lining 21, a fire brick lining 22 in its upper part and a graphitized carbon lining 23 in its lower part. An opening 24 is provided in the upper end of the furnace through which it is charged and through which a carbon electrode 25 may be inserted into the charge within the furnace. A spout 26 is provided for pouring metal and fusion from the lower part of the furnace. A pair of tuyères 27 open into the furnace through trunnions just above the carbon lining. Carbon inserts 28 are provided for electrical connection to the carbon lining in the lower part of the furnace. In this smelting furnace, alumina is dissolved in the fluoride fusion circulated through the electrolytic cells from aluminiferous material in the presence of carbon at a temperature effective to reduce iron compounds present to metallic iron.

In one way of operating this smelting furnace, the furnace is almost filled with coke 31 and a charge 32 of the aluminiferous material or ore to be processed for production of aluminum is placed upon the coke. By means of the tuyères air is then blown through the coke charge until a temperature of about 1000° C., just above the melting point of cryolite or of the fusion used for electrolysis and not high enough to involve substantial vaporization of fluoride from the fusion, is attained through the body of coke. The air is then cut off and the fluoride fusion material together with any fluoride make-up material such as aluminum fluoride or cryolite is charged into the furnace through the body of ore on top of the coke until it is dissolved. The crolite or fluoride fusion mixture is with advantage introduced into the furnace in molten condition although it may be charged as a solid, broken up and distributed over the body of ore, and there fused. In passing through the ore, the fusion dissolves the alumina and as the molten salt moves downwardly through the coke, the bulk of any iron compounds present in the ore and carried into the fusion is reduced and precipitated upon the coke. Depending upon the composition of the iron, this iron may melt and flow to the bottom of the furnace, or all or part of it may initially remain upon the coke. Thus a body 29 of molten fluorides, containing the alumina dissolved from the ore charged to the furnace, accumulates in the lower part of the furnace. Once the operation is established, a body 30 of molten iron or iron alloy is accumulated and maintained in the lower part of the furnace. If the ore contains insufficient iron to provide this body, scrap iron or the like in the requisite amount is also charged to the smelting furnace. The fluoride fusion is further purified, particularly with respect to silicon and titanium, by contact at high temperature with this molten metal. To facilitate such purification, the body of molten iron or iron alloy in the lower part of the furnace may be stirred, electromagnetically for example. Electromagnetic stirring of the fused electrolyte in the electrolytic production of aluminum is described in the The Aluminum Industry, by Edwards, Frary & Jeffreys, 1930 edition, page 309, published by McGraw-Hill Book Company. The fluoride fusion can be further purified after passage through the coke before being poured from the furnace, by again blowing the coke with air, through the tuyères 27, to raise the temperature in the upper part of the furnace to a point at which the reduced iron and any associated impurities melt and move downwardly through the coke and thence through the fluoride fusion into the molten metal in the lower part of the furnace. This cycle of operations is repeated to maintain the required supply of fluoride fusion containing dissolved alumina to be poured from the furnace as required for electrolysis. The molten metal is poured from the furnace from time to time as it accumulates.

With some ores, impurities present along with the iron, particularly phosphorus, form an impure iron in the furnace with a melting point low enough to permit the melting of the iron reduced by the coke at a temperature not too much in excess of 1000° C. to involve serious loss through vaporization of fluorides in the furnace. However, with other ores, the composition of the iron may be such that it tends to remain on the coke except at temperatures excessively high with respect to the fluoride fusion. In this event, the iron can be removed from the coke by melting, by air-blowing, after the bulk of the fluoride fusion has been poured from the furnace or a phosphorous-bearing material, such as aluminum phosphate, may with advantage be added with the ore charged to the furnace to lower the melting point of the iron produced.

In the modification illustrated in Fig. 4, a boot 33 is arranged in the lower part of the furnace in which metal produced in the furnace accumulates to permit induction heating by means of a winding 34 of the body of metal in the lower part of the furnace independently of the heating of the bulk of the furnace charge above the fluoride fusion collecting in the lower part of the furnace. Also, in the furnace illustrated in Fig. 2, all or part of the heat required can be supplied electrically, instead of by combustion of coke, by inserting the electrode 25 in the upper part of the furnace charge and by connecting an appropriate source of either alternating or direct current power across the electrode 25 and the carbon lining 23 in the lower part of the furnace.

In the modification illustrated in Fig. 5, an electrode 35 is arranged to be inserted in the fluoride fusion accumulating in the lower part of the furnace above the layer 30 of molten metal to make this molten metal cathodic to effect a further purification of the fluoride fusion with respect to elements more electro-positive than aluminum within the smelting furnace. A similar purification can be effected in the apparatus illustrated in Fig. 2, in connection with electrical heating of the furnace, by passing a direct current between electrode 25 as the anode and the carbon lining 23 as the cathode. When effecting purification in this manner, it is essential that a layer of molten metal to absorb such impurities as alloying elements be maintained in the lower part of the furnace during the electrolysis.

Referring to Figs. 6, 7 and 8: The cells, or as they are commonly called reduction pots illustrated are, considered individually, conventional in character. Each cell comprises a graphitized carbon cell chamber 36 supported by but thermally insulated from a concrete foundation 37 by means of a layer of refractories 38 and a pair of carbon anodes 39 suspended by metal supports 40 also serving to connect the anodes to the bus-bar system. These anodes are shown elevated above normal operating position in Figs. 6 and 8 to facilitate illustration of the rest of the cell structure. Petroleum coke is a conventional and satisfactory anode material. Iron inserts 41 in the bases of each of the several cell chambers through extensions 42 serve to connect the cell chambers to the bus-bar system. In apparatus for carrying out my invention, each of the cells of the series is connected to the next cell by a trough which provides for transfer of the fused electrolyte seriatim from cell to cell through the series. These troughs are illustrated particularly in Figs. 6 and 7. As shown, the normal level of the liquid electrolyte in each cell chamber other than the first is slightly lower than that of the preceding chamber. Each cell chamber being connected to the next by a trough 43, the electrolyte thus flows from cell to cell through the series from the first cell to the last cell of the series. Each of these troughs is also supported by but thermally insulated from the concrete foundation 37 by the refractory layer 38. The trough lining 44 in contact with the electrolyte is formed of graphitized carbon to resist the action of the electrolyte, but to break the electrical connection between adjacent cell chambers through the trough lining, the series of alumina separators 45, originally of the same section as the trough, are inserted as spacers in the carbon lining of the trough between each pair of cells.

In carrying out my invention in the apparatus illustrated in the accompanying drawings: I put each of the several cells of a series in operation in the usual way as individual cells. Then, with all of the cells of the series in operation, I establish a flow of electrolyte through the cells by charging a fluoride fusion containing a high concentration of dissolved alumina to the first cell of the series and by discharging a fluoride fusion containing a low concentration of alumina from the last cell of the series. As previously stated, concentration of alumina in the fusion charged to the first cell of the series may approximate 12%–14% and that of the fusion discharged from the last cell of the series may approximate 2%–2.5% once the cycle of movement had been established. The balance of the fusion may be of any conventional composition. The alumina content of the fusion discharged from the last cell of the series is replenished by dissolving alumina in the fusion. Any losses of fluoride from the fusion are conveniently made up by appropriate additions at the same time. This addition of alumina to the fusion constituting the electrolyte is effected, in one particularly advantageous embodiment of my invention, in the smelting operation previously described in connection with the smelting furnace illustrated in the accompanying drawings. In this furnace, the alumina content of the aluminiferous material used for the production of aluminum is dissolved in the fluoride fusion, is in effect extracted with the fluoride fusion, and the fusion containing dissolved alumina is at the same time subjected to a purification with respect particularly to iron, silicon and titanium. The fluoride fusion replenished with respect to alumina, and at least partially purified, is charged to the first cell of the series. A cycle of electrolyte flow in which the electrolyte is repeatedly replenished with dissolved alumina and in which the alumina thus supplied is progressively electrolyzed to produce aluminum in a series of cells is thus established. The alumina added to the electrolyte moving in this cycle is, in each repetition of the cycle, dissolved in the fluoride fusion before the fusion enters the first cell of the series. The impurities more electropositive than aluminum, and thus tending to collect in the aluminum produced by electrolysis, particularly iron, silicon and titanium, present in the fusion charged to the first cell of the series are preferentially liberated in the first cell or the first few cells of the series. Depending upon the purity of the original ore, and the extent of purification prior to and during solution of its alumina content in the fluoride fusion constituting the electrolyte, such impurities will appear in the aluminum metal separated in a greater or lesser number of the cells of the series through which the fusion first passes after the step of solution of the alumina. Once these impurities have been eliminated, down to any selected standard of purity, in the cells through which the fusion first passes, the metal produced in the remaining cells of the series will be of purity equal to or better than the selected standard. Thus, by segregating the metal produced in these initial cells, the direct production of aluminum of high purity is accomplished without requiring the separate production in a complex operation of alumina of high purity. The productive capacity of individual cells is not impaired, and losses in productive capacity due to the presence of insufficient alumina in the electrolyte or to the presence of undissolved solid alumina in the electrolyte are avoided in a practical way.

The less pure aluminum separated in the initial cell or cells of the series, when below the purity required of metal for fabrication of aluminum products, is useful as a de-oxidant in the manufacture of steel. The iron or iron alloy, separated in the smelting furnace operation I have described as one advantageous way of dissolving alumina from the ore in the fluoride fusion subjected to electrolysis, is also recovered as a by-product in useful form.

Some aluminiferous materials, raw or partially processed bauxites, occur in a form or in a state of sub-division such that the impurities, particularly compounds of iron and silicon, become dispersed in an extraordinarily minute state of sub-division in caustic liquors used, as in the Bayer process, to dissolve their alumina content and thus impose an unusual burden upon conventional practices in connection with the separation of such dispersed solid impurities prior to precipitation of aluminum hydrate from the solution. My process is of special advantage in application to such raw materials for the production of aluminum.

The process of my invention has a number of important advantages, some of which will have appeared from the foregoing description. My process makes it unnecessary to carry the alumina content of the raw material for production of aluminum through any step of solution as an aluminate as an essential step. My process substitutes a single, relatively simple, extraction with the fusion constituting the electrolyte, advantageously embodied in the smelting furnace operation which has been described, for the multi-step processes for recovery of alumina of the requisite purity from the ores available required by previous practices. My process permits the ready application of chemical control by providing for solution of the alumina in the electrolyte fusion outside of the electrolytic cells. My process avoids coating or mucking of the cathode with undissolved solid alumina and permits the safe use of higher concentrations of alumina in the electrolyte with corresponding reductions in the average melting point and in the average electrical resistance of the electrolyte as it passes through the series of cells. Anode effect is avoided in my process, reducing several losses involved including power losses, losses through volatilization of fluorides, and losses through re-oxidation of aluminum. Uniformity of operation is promoted by my process, cell by cell and overall. Uniformity of heat distribution is promoted by my process, both through improved uniformity of fusion composition in each cell and as a result of the regular electrolyte circulation. As compared to conventional practice, the charging of alumina to the electrolysis is materially simplified in my process. In this respect, and in the improved control afforded with respect to electrolysis, and in the elimination of a number of steps previously involved in preparation of the alumina, my process saves labor. The regular aeration of the circulating fluoride fusion also improves the operation in providing for regular elimination, through oxidation, of dispersed carbon picked up by the electrolyte as a result of electrode disintegration within the cells. The smelting furnace operation by which I prefer to add fresh alumina to the circulating electrolyte assists in purifying the fluoride fusion itself as well as the aluminiferous material to be electrolyzed. This operation also provides for a maximum recovery of the alumina content of the aluminiferous material charged to the smelting furnace, as compared for example to losses of alumina which increase in proportion to the silica content of ore treated by the Bayer process. Purification of the circulating electrolyte, including the purification effected in the cells of a series through which the electrolyte is first passed after being replenished with respect to alumina content, coupled with segregation of the less pure metal separated in the initial cell or cells permits the direct production of aluminum of high purity without requiring elaborate processing of the raw aluminiferous material and without imposing rigorous limits of purity upon alumina dissolved in the electrolyte in my process. Also, as a result of this progressive purification of the electrolyte characteristic of my process, by using electrodes of high purity in the last two cells of a series, for example, by extracting the electrode carbon with hydrochloric acid to eliminate iron and with hydrofluoric acid to eliminate silica, and by segregating the metal produced in these last few cells, I can produce aluminum of exceptionally high purity as the direct product of the electrolysis in these final cells.

I claim:

1. In the electrolytic production of aluminum from alumina dissolved in a fluoride fusion, the improvement which comprises circulating an alumina-containing fluoride fusion consisting essentially of the fluorides of sodium and aluminum through a series of cells in each of which it is subjected to electrolysis resulting in a diminution of the alumina content of the fusion and in liberation of fused metallic aluminum, transferring the fluoride fusion discharged from the last cell of the series to an alumina-replenishing zone and in said zone dissolving alumina in the alumina-depleted fluoride fusion by bringing said fusion in the presence of carbon into contact with a charge of material consisting essentially of aluminum compounds of the class consisting of alumina and hydrated aluminum oxides and also containing impurities including iron compounds while maintaining in said alumina-replenishing zone a temperature effective to reduce iron compounds present to metallic iron, separating reduced iron from the fluoride fusion, again circulating the fluoride fusion with its alumina content thus replenished through the series of cells in a cyclic manner, withdrawing from said cells the fused metallic aluminum liberated therein, and segregating the aluminum withdrawn from an initial minor portion of the cells of said series from the aluminum of relatively high purity withdrawn from the subsequent major portion of the cells of said series in the direction of electrolyte circulation.

2. In the electrolytic production of aluminum from alumina dissolved in a fluoride fusion, the improvement which comprises circulating an alumina-containing fluoride fusion consisting essentially of the fluorides of sodium and aluminum through a series of cells in each of which it is subjected to electrolysis resulting in a diminution of the alumina content of the fusion and in liberation of fused metallic aluminum, transferring the alumina-depleted fluoride fusion discharged from the last cell of the series to an alumina-replenishing zone heated to maintain the fusion temperature and in said zone dissolving alumina in the alumina-depleted fluoride fusion in an amount sufficient to produce a fusion containing alumina in a concentration approximating 12%–14%, again circulating the fusion with its alumina content thus replenished through the series of cells in a cyclic manner, and withdrawing from said cells the fused metallic aluminum liberated therein.

ARTHUR F. JOHNSON.

REFERENCES CITED

The following references are of record in the file of this patent:

UNITED STATES PATENTS

| Number | Name | Date |
|---|---|---|
| 795,886 | Betts | Aug. 1, 1905 |
| 1,384,499 | Tucker | July 12, 1921 |
| 1,534,316 | Hoopes et al. | Apr. 21, 1925 |
| 1,709,759 | Weber et al. | Apr. 16, 1929 |
| 2,162,942 | de Rohden | June 20, 1939 |

FOREIGN PATENTS

| Number | Country | Date |
|---|---|---|
| 433 | Great Britain | 1908 |
| 272,246 | Great Britain | Nov. 10, 1927 |
| 503,578 | Great Britain | Apr. 11, 1939 |
| 520,851 | Germany | Mar. 14, 1931 |
| 642,644 | Germany | Mar. 11, 1937 |